United States Patent

Hopkins

[11] Patent Number: 5,841,397
[45] Date of Patent: Nov. 24, 1998

[54] AUTOTRACKING ANTENNA SYSTEM

[75] Inventor: Jeffery G. Hopkins, Valencia, Calif.

[73] Assignee: Wescam Inc., Flamborough, Canada

[21] Appl. No.: 693,741

[22] Filed: Aug. 7, 1996

[51] Int. Cl.[6] .................................................. H01Q 3/00
[52] U.S. Cl. ............................ 342/359; 342/75; 342/424
[58] Field of Search .............................. 342/75, 422, 424, 342/449, 359

[56] References Cited

U.S. PATENT DOCUMENTS

| | | | |
|---|---|---|---|
| 4,758,840 | 7/1988 | Dardenne et al. | 342/359 |
| 4,945,410 | 7/1990 | Walling | 358/141 |
| 5,077,561 | 12/1991 | Gorton et al. | 342/359 |
| 5,463,403 | 10/1995 | Walker et al. | 342/359 |
| 5,592,176 | 1/1997 | Vickers et al. | 342/359 |

*Primary Examiner*—Thomas H. Tarcza
*Assistant Examiner*—Dao L. Phan
*Attorney, Agent, or Firm*—Rogers & Scott

[57] ABSTRACT

An autotracking antenna system operable to cause a steerable antenna assembly to automatically track a moving RF video signal source has a reflector, a rotator for positioning the reflector at any desired position in azimuth and elevation, a primary antenna element positioned to receive an RF video signal reflected from the center of the reflector, and a series of offset antenna elements each positioned to receive an RF video signal reflected from a different off-center location on the reflector. A tracking control processor is operable to select and receive video signals from the primary antenna element and the offset antenna elements and to control the rotator, and a signal receiver receives video signals from the antenna element and has a video signal output. The tracking control processor operates to periodically obtain consecutive samples of the signals from the primary antenna element and the offset antenna element during a predetermined off-screen line of video frames of the RF video signal, and to control the rotator to position the reflector such that the signals received by the offset antenna elements are of substantially equal strength, whereby the primary antenna element receives a signal of maximum possible strength from the RF video source.

3 Claims, 7 Drawing Sheets

AUTOTRACKING ANTENNA SYSTEM

This invention relates to autotracking antenna systems which operate to cause a steerable antenna assembly to automatically track a moving RF video signal source, such as a video camera carried by an aircraft.

BACKGROUND OF THE INVENTION

Such steerable antenna assemblies usually have a reflector attached to a rotator controllable to position the reflector at any desired position in azimuth and elevation, the antenna assembly also having a primary antenna aimed directly at the centre of the reflector and offset antenna elements, i.e. antenna elements aimed at different off-centre locations on the reflector. In known autotracking systems of this kind, the outputs of the offset antenna elements are summed in an RF summing network, which in turn feeds a receiver which is additional to the receiver for the video signal from the primary antenna element. By using an RF sum/difference network for the signals from the offset antenna elements, the difference measurements at any given time are independent of the relative level of the signal and are utilized to adjust the azimuth and elevation of the reflector until the difference measurements are zero, thereby obtaining a signal of maximum strength from the primary antenna element. However, such energy seeking tracking systems are expensive because of the cost of the additional receiver and the RF sum-difference network. One example of such known autotracking antenna systems is described in U.S. Pat. No. 5,245,348 (Nishikawa et al.) issued Sep. 14, 1993.

It is therefore an object of the invention to provide a satisfactory autotracking antenna system which is less expensive than such known systems.

SUMMARY OF THE INVENTION

According to the invention, an autotracking antenna system operable to cause a steerable antenna assembly to automatically track a moving RF video signal source has a rotator for positioning a reflector at any desired position in azimuth and elevation, a primary antenna element positioned to receive an RF video signal reflected from the centre of the reflector, and a series of offset antenna elements each positioned to receive an RF video signal reflected from a different off-centre location on the reflector. A tracking control processor is operable to select and receive video signals from the primary antenna element and the offset antenna elements and to control the rotator, and a signal receiver receives video signals from the antenna elements and has a video signal output. The tracking control processor operates to periodically obtain consecutive samples of the signals from the primary antenna element and the offset antenna elements during a predetermined off-screen line of video frames of the RF video signal, and to control the rotator to position the reflector such that the signals received by the offset antenna elements are of substantially equal strength, whereby the primary antenna element receives a signal of maximum possible strength from the RF video source.

Preferably, the tracking control processor operates to obtain the composite samples during a predetermined off-screen line of each video frame of the RF video signal.

The autotracking antenna system may also have an acquisition aid antenna element positioned to receive a video signal directly from the moving RF video source, with the tracking control processor receiving the direct video signal from the acquisition aid antenna element, when not in a tracking mode, to control the rotator to cause the reflector to scan a predetermined path area for a maximum signal and then to adopt the tracking mode when the maximum signal has been sensed.

DESCRIPTION OF THE DRAWINGS

One embodiment of the invention will now be described, by way of example, with reference to the accompanying drawings, of which.

DESCRIPTION OF THE PREFERRED EMBODIMENTS

Figure 1:
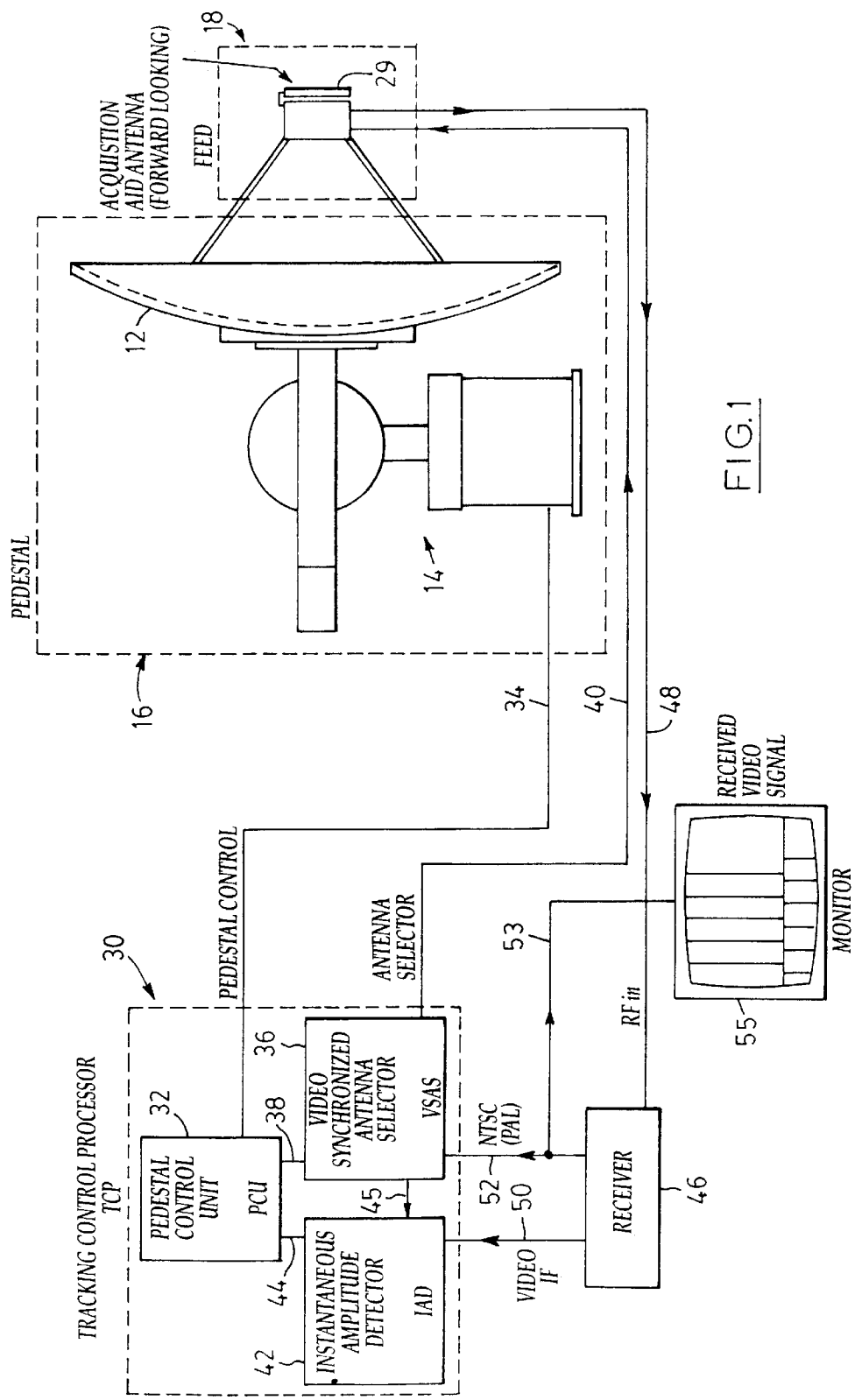
FIG. 1 is a schematic view of an autotracking antenna system in accordance with one embodiment of the invention.

Referring to the drawings, an autotracking system operable to cause a steerable high-gain antenna assembly to automatically track a moving RF video source, such as a video camera carried by a helicopter, has a parabolic dish reflector 12 and a rotator 14 for positioning the reflector 12 at any desired position in azimuth and elevation, the reflector 12 and rotator 14 being mounted on a pedestal 16, as shown in FIG. 1.

Figure 2:
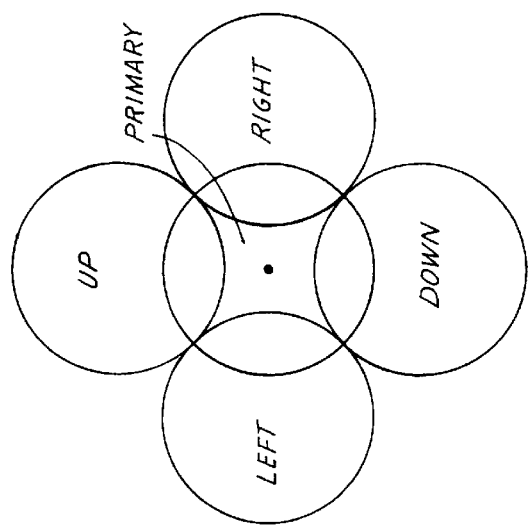
FIG. 2 is a similar view showing the reflector areas at which the primary antenna element and the offset antenna elements are aimed.

A signal feed assembly 18 carried by the reflector 12 has a primary antenna element 20 providing the main (i.e. primary) feed signal, the primary antenna element 20 being aimed directly at the centre of the reflector 12 as indicated in FIG. 2. Four offset antenna elements 22, 24, 26, 28 are positioned in the manner indicated in FIG. 2, i.e. aimed slightly off-centre of the reflector 12 and in the four quadrants of up, down, left and right. As will be described in more detail later, switching to any of the offset antenna elements 22, 24, 26, 28 will cause the signal to attenuate about 3 dB, compared to the signal from the primary antenna element 20, when the reflector 12 is aimed directly at the video source, which may for example provide an NTSC or PAL composite video signal. As will also be described in more detail later, the signal feed assembly 18 also has an acquisition aid antenna 29 which receives a signal from the video signal source directly, i.e. faces forwardly away from the reflector 12.

Rotating the reflector 12 to its 3 dB point in the direction of any of the offset (i.e. outer) antenna elements 22, 24, 26, 28 will bring that antenna element into maximum focus. However, when the reflector 12 is properly pointing at the video source signal, the outer antenna elements 22, 24, 26, 28 will receive equal signals 3 dB less than the signal received by the primary antenna element 20.

The antenna system further includes a tracking control processor 30 operable to select and receive video signals from the primary antenna element 20 and from the offset antenna elements 22, 24, 26, 28 and to control the rotator 14, as indicated in FIG. 1. The tracking control processor 30 includes a pedestal control unit 32 connected by line 34 to the rotator 14, a video synchronised antenna selector 36 connected by line 38 to the pedestal control unit 34 and by line 40 to the signal feed assembly 18, and an instantaneous amplitude detector 42 connected by line 44 to the pedestal control unit 32. The video synchronised antenna selector 36 is also connected to the instantaneous amplitude detector 42 by line 45.

The antenna system also has a receiver 46 to receive video signals from the antenna elements 20, 22, 24, 26, 28 and the acquisition aid antenna 29 through line 48. The receiver 46 has a video IF output connected by line 50 to the instantaneous amplitude detector 42, and a composite video signal output connected by line 52 to the video synchronised antenna selector 36 and by line 53 to a monitor 55.

Figure 3:
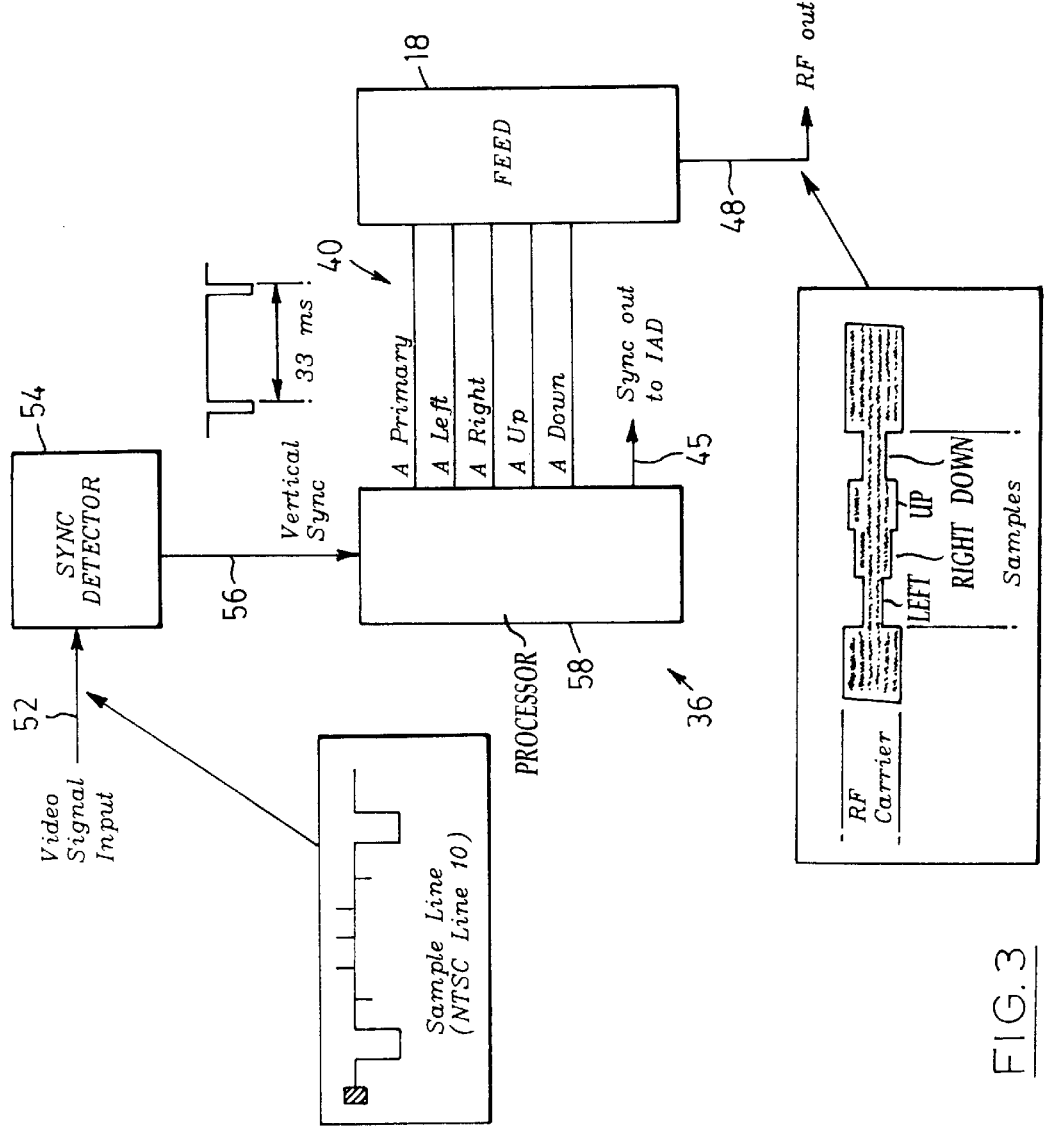
FIG. 3 is a similar view of the video synchronized antenna selector.
Figure 3A:
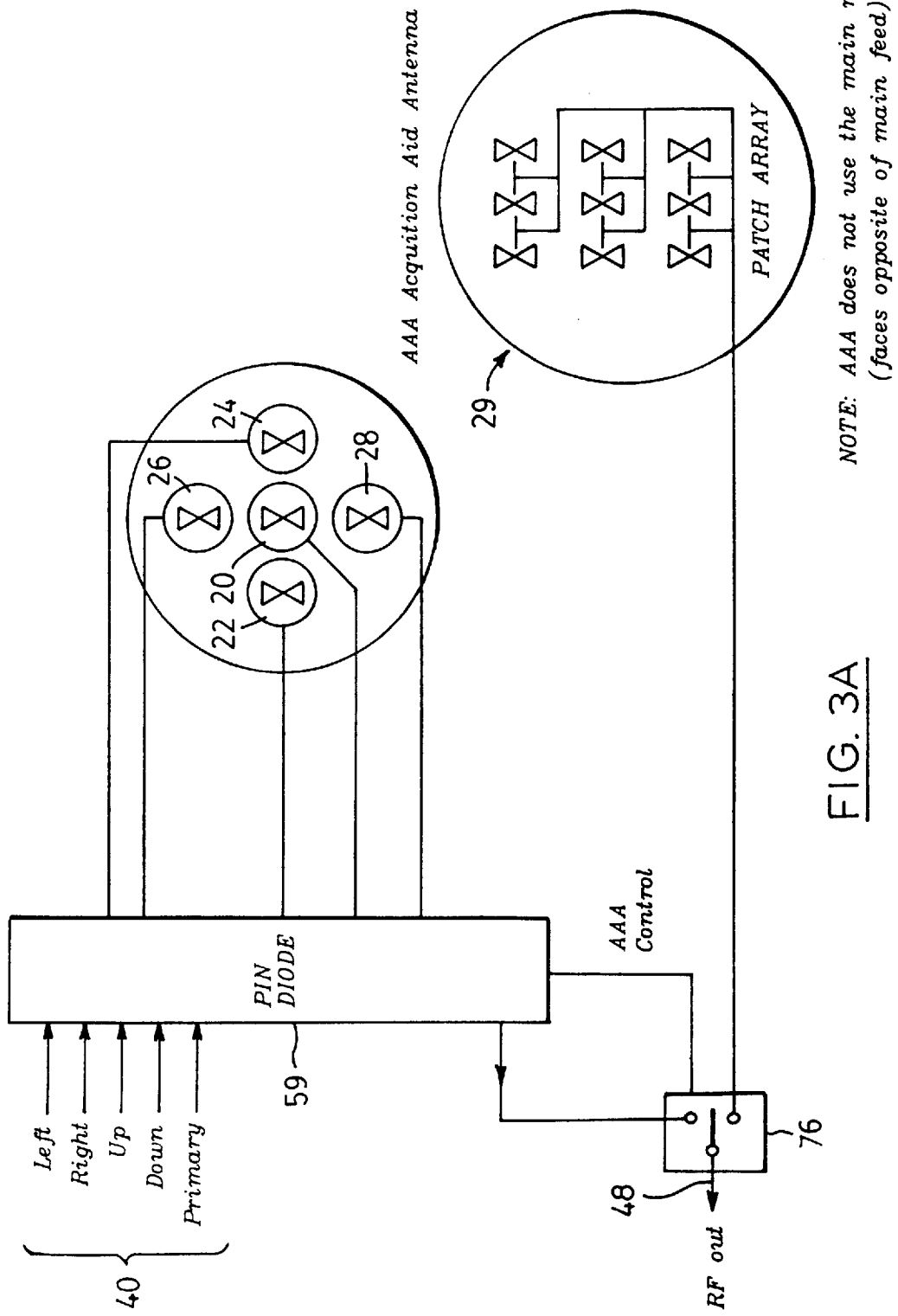
FIG. 3A is a similar view showing the pin diode and related circuitry.

The video synchronised antenna selector is shown in more detail in FIG. 3. The video signal received along line 52 from receiver 46 is fed to a sync detector 54 which feeds a vertical sync signal along line 56 to an antenna selector processor 58. The antenna selector processor 58 has a high speed five-pole pin-diode switch 59 (see FIG. 3A) which operates to select which of the antenna elements 20, 22, 24, 26, 28 feeds its signal along line 48 to the receiver 46. In accordance with the invention, the processor 58 causes the signal fed to receiver 46 to be the primary signal from the primary antenna element 20 except when consecutive samples are taken of the signals from the offset antenna elements 22, 24, 26, 28 during a predetermined off-screen line of each video frame of the video signal, i.e. during a non-critical portion of the signal or, in other words, during an off-screen black line. In this embodiment, line 10 of an NSTC signal is used for this purpose. The pin-diode switch is capable of switching from one antenna element to another in under 1 μs.

Figure 4:
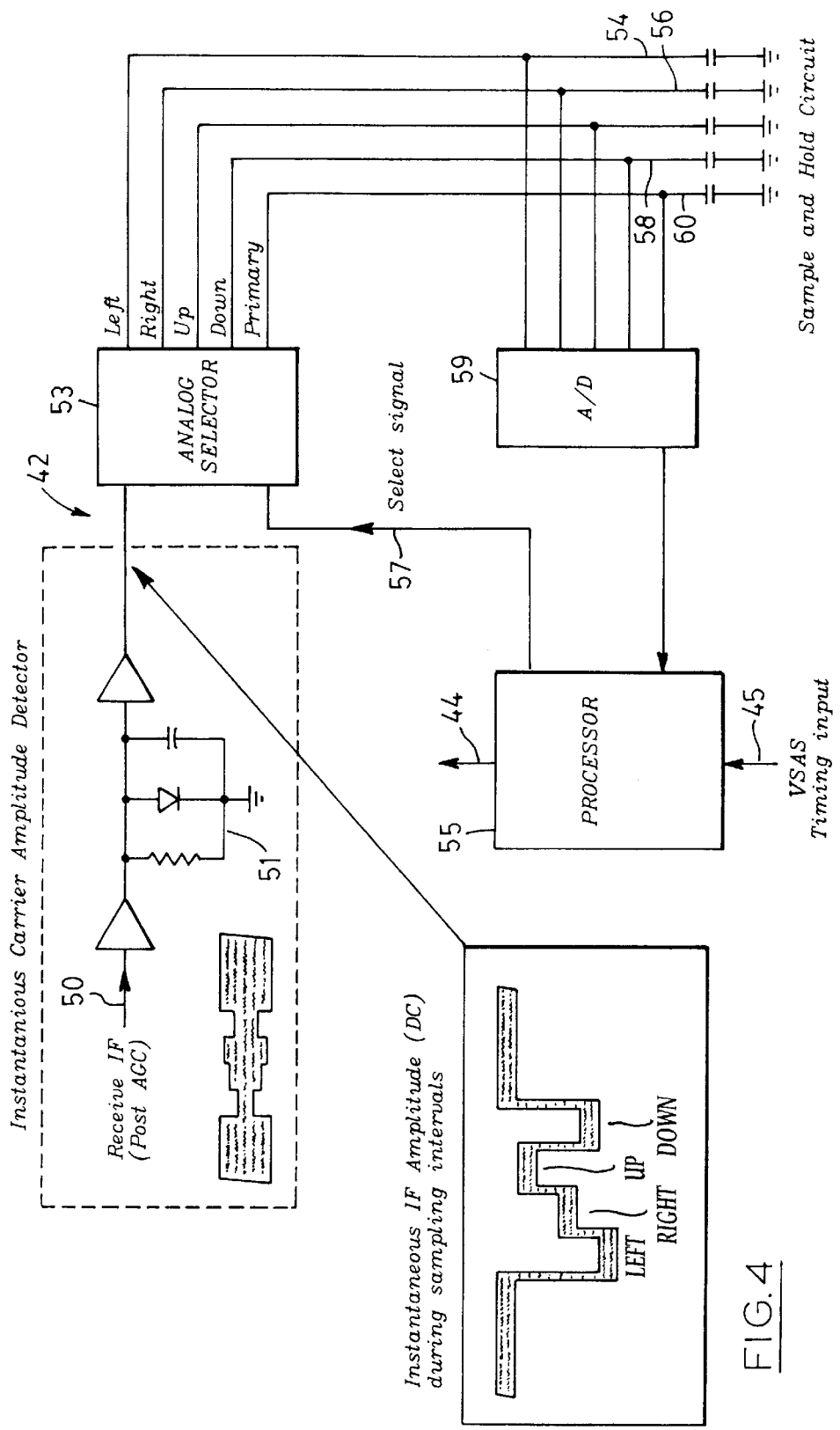
FIG. 4 is a schematic view of the instantaneous amplitude detector.

The sync detector 54 outputs both horizontal timing and odd/even field timing of the received video signal. The antenna signal processor 58 counts the lines following the odd/even timing pulse in order to locate the beginning of line 10. This line is several lines before active video in a portion of the signal which is off-screen and is always transmitted in black. After the line is located, a timer in the processor 58 activates the first circuit 52 of five sample and hold circuits (see FIG. 4) in the instantaneous amplitude detector 42 about 10 μs into the active area of the line. At the same time, the signal from the primary antenna element 20 is selected, with this sample representing the reference signal level. This sample is taken for 8 μs.

At the end of the main sample, the timer selects the left antenna element 22 and the sample and hold circuit 54 which captures the instantaneous level of this sample. This process is repeated for each of the remaining offset antenna elements 24, 26, 28, (i.e. right, up and down) after which the timer switches the feed back to the primary antenna element 20 for the remainder of the frame and notifies the processor that the samples are ready. Waveforms of the input to the sync detector 54 and the output from the feed assembly 18 during the sampling process are also shown in FIG. 3. The entire sampling time is less than 40 μs, and the sampling rate is 33 ms.

As will be described in more detail later, the instantaneous amplitude detector 42 receives a video IF signal from the receiver 46 which is fed to an instantaneous carrier amplitude detector circuit 51, the output from which is fed to an analogue selector 53. A timing signal is fed from the video synchronised antenna selector 36 through line 45 to a processor 55 in the instantaneous amplitude detector 42. Processor 55 is connected by line 57 to the analogue selector 53 to cause the signal from the selected antenna element to be fed to the appropriate sample and hold circuit 54, 56, 58 or 60.

Each sample and hold circuit 54, 56, 58, 60 is connected through an A/D converter 59 to the processor 55 which feeds the necessary signal through line 44 to the pedestal control unit 32.

At the end of the sampling process, each of the five sample and hold circuits 52, 54, 56, 58, 60 contains the instantaneous IF carrier level from the receiver 46 for each antenna element 20, 22, 24, 26, 28. Under normal operation, the receiver IF maintains a constant output by its AGC circuit. However, because the sample periods are very short, the receiver AGC has very little effect on the level of each sample (compared to the primary signal), thereby providing a linear relationship to the antenna's offset from the received signal with respect to the primary and four offset feeds.

Figure 5:
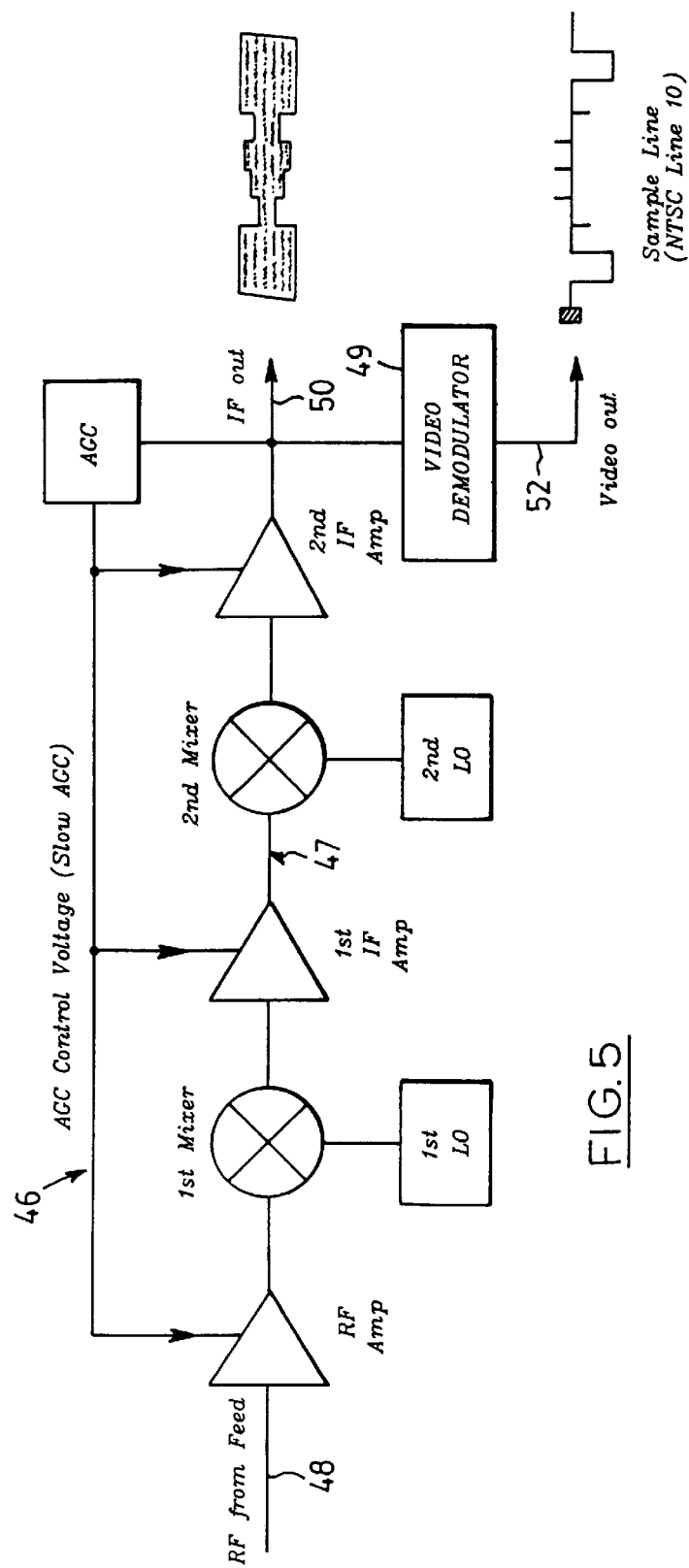
FIG. 5 is a similar view of the receiver.

FIG. 5 shows the receiver 46 in more detail and also shows the IF output and video output signals during signal sampling.

The receiver 46 is a conventional microwave receiver, with the RF signal received from the signal feed assembly 18 through line 48 being fed to an AGC control voltage (slow AGC) circuit 47 to produce an IF output for line 50 and to produce a composite video signal for line 52 via a video demodulator 49.

Figure 5A:
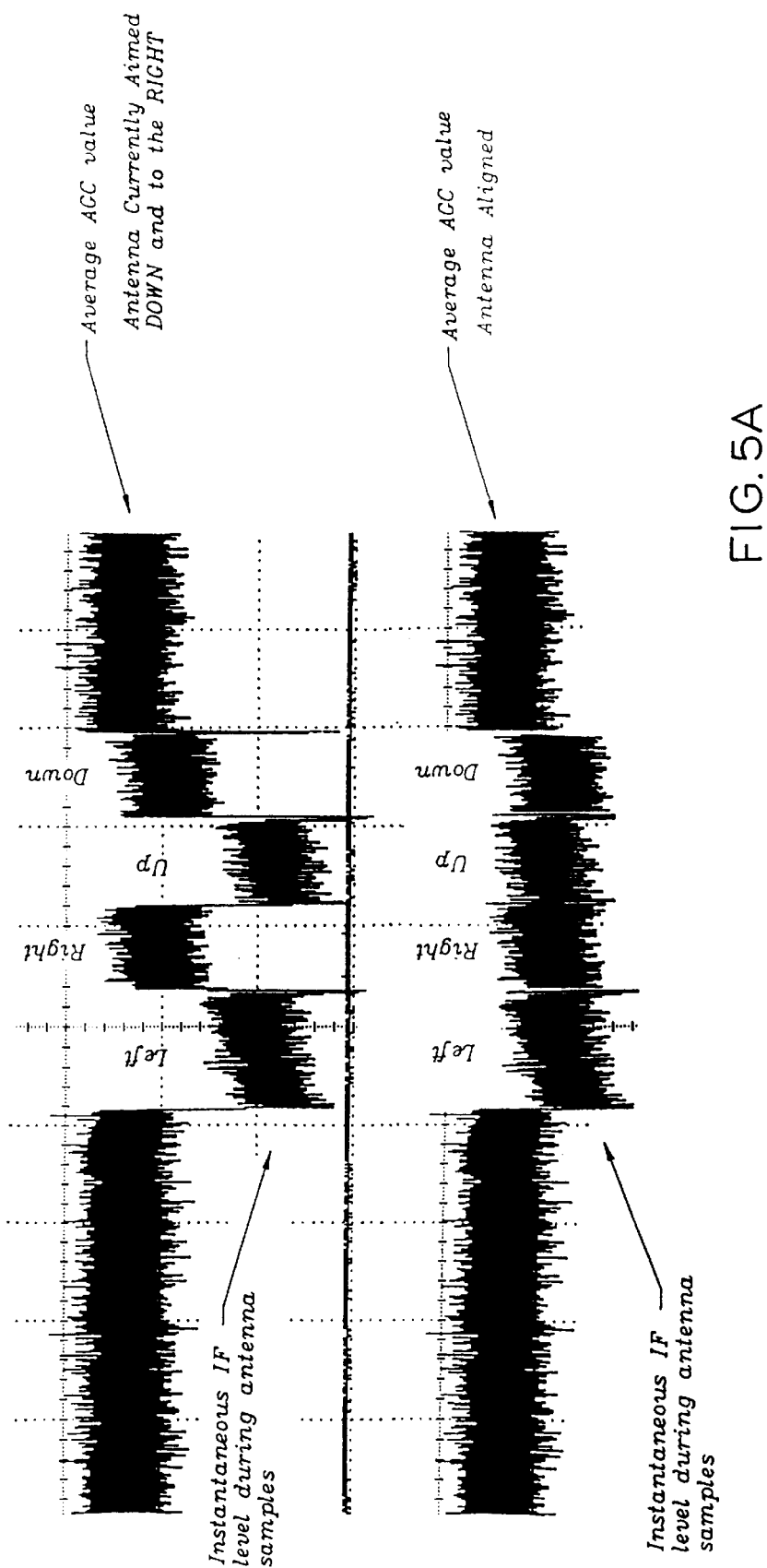
FIG. 5A shows IF signals from the receiver.

FIG. 5A shows the instantaneous IF signal levels during signal sampling when the reflector is aimed down and to the right (upper graph) relative to the signal source and aimed directly at the source (lower graph).

Figure 6:
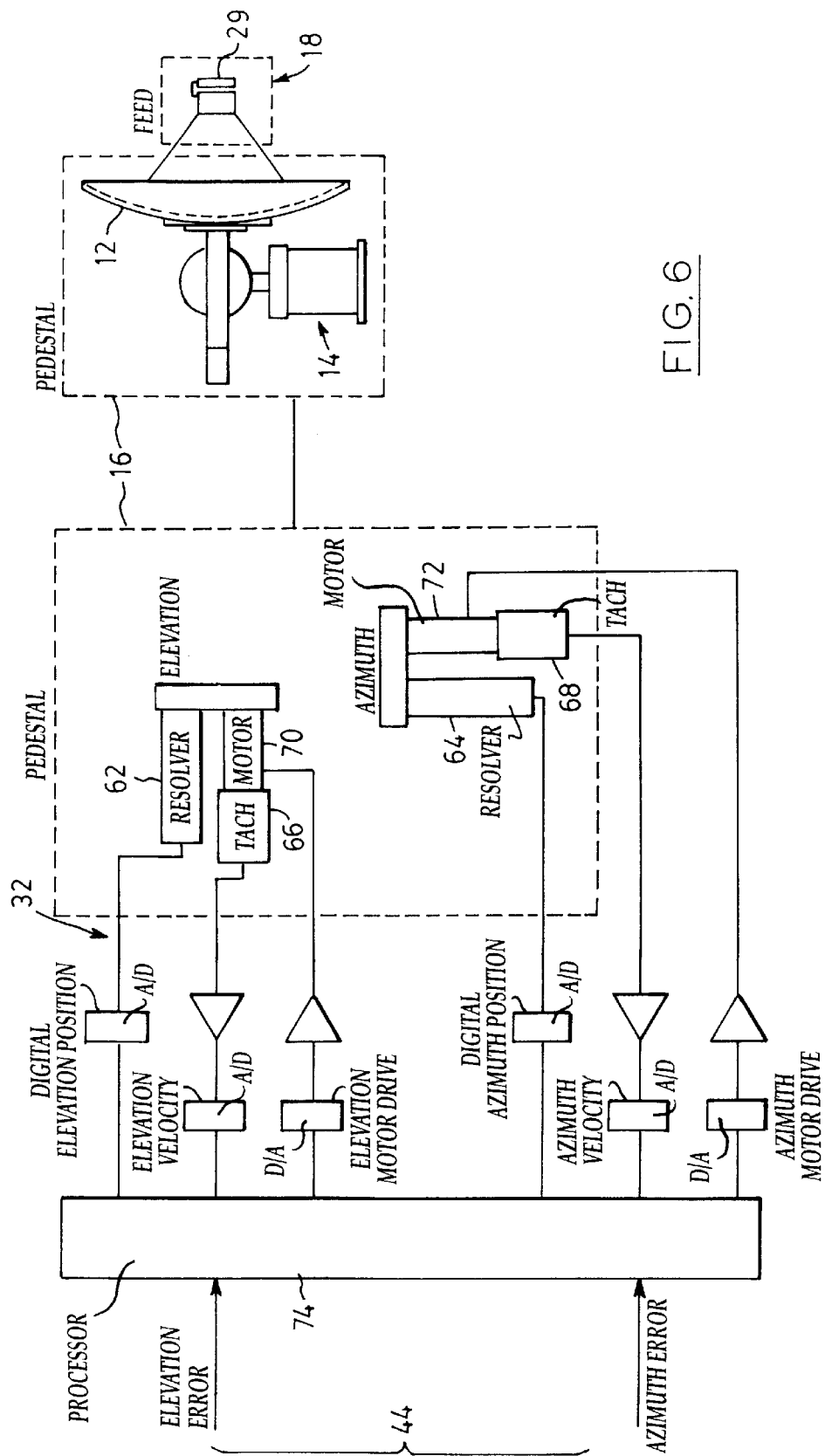
FIG. 6 is a schematic view of the pedestal control unit.

FIG. 6 shows the pedestal control unit 32 in more detail. The pedestal control unit 32 provides a closed-loop servo to maintain a commanded velocity in each of the azimuth and elevation axes. A resolver 62, 64 measures the current position of the relevant axis, and a tachometer 66, 68 measures the current velocity thereof. Motors 70, 72 drive the axis concerned in the relevant direction. The processor 74 compares the current velocity with the commanded velocity (calculated from the azimuth and elevation error inputs), and adjusts the relevant motor drive output accordingly. Thus, the system operates to monitor a 3 dB delta between the offset antenna elements 22, 24, 26, 28 and the primary antenna elements 20, with small differences in each reading being used to command the primary antenna element in the proper direction to maintain the primary feed's focus.

The forward looking acquisition aid antenna 29 has a patch array of antenna elements (see FIG. 3A) which provides less gain but a much wider beam than the primary antenna element 20. When the antenna system is not currently tracking the signal, i.e. is not within the tracking window which is set to approximately the three dB point, the acquisition aid antenna 29 is selected by the video synchronised antenna selector 36 by means of a switch 76, and a given path area is automatically scanned to look for the maximum signal received during the scan. Although the signal remains weak during acquisition, the use of the wider beam of the acquisition aid antenna 29 makes it possible to acquire the signal in far less time than if the primary antenna 20 was relied on for acquisition as is the case in most known systems.

Thus, the received acquisition aid antenna signal is used, together with the video detect circuit, to locate the signal and then steer the antenna such that the signal is within the tracking window. At this stage, the signal is transferred to the primary and offset antenna elements for tracking. The output video signal will maintain a constant level as long as the system remains tracking.

The advantages of the invention, in particular cost saving compared to the prior art, will be readily apparent to a person skilled in the art from the foregoing description of a preferred embodiment. Other possible embodiments of the invention will also be readily apparent. For example, the invention can be utilized with other types of video signals, provided that a portion of the repetitive signal can be degraded during the sampling intervals. The method of RF modulation is not a factor because the system always samples at the same point in the repetitive video signal. The amplitude of the black portion of the same line remains a constant, as it relates to the average AGC level of the entire frame. If the precise black-level integrity of the off-screen line is required, the local circuit can synthesize the original black level by comparing the previous line. Because microwave video transmission relies on FM modulation, these short amplitude changes will have little effect on the signal and reconstruction should not be required. The scope of the invention is defined in the appended claims.

I claim:

1. An autotracking antenna system operable to cause a steerable antenna assembly to automatically track a moving RF video signal source, said system having:

a reflector:
      a rotator for positioning the reflector at any desired position in azimuth and elevation,
      a primary antenna element positioned to receive an RF video signal reflected from the centre of the reflector,
      a series of offset antenna elements each positioned to receive an RF video signal reflected from a different off-centre location on the reflector,
      a tracking control processor operable to select and receive video signals from the primary antenna element and the offset antenna elements and to control the rotator, and
      a signal receiver to receive video signals from the antenna element and having a video signal output,
   the tracking control processor operating to periodically obtain consecutive samples of the signals from the primary antenna element and the offset antenna element during a predetermined off-screen line of video frames of the RF video signal, and to control the rotator to position the reflector such that the signals received by the offset antenna elements are of substantially equal strength, whereby the primary antenna element receives a signal of maximum possible strength from the RF video source.

2. An autotracking system according to claim 1 wherein the tracking control processor operates to obtain said consecutive signal samples during a predetermined off-screen line of each video frame of the RF video signal.

3. An autotracking antenna system according to claim 1 also having an acquisition aid antenna element positioned to receive a video signal directly from the moving RF video source,
   said tracking control processor receiving the direct video signal from the acquisition aid antenna element, when not in a tracking mode, to control the rotator to cause the reflector to scan a predetermined path area for a maximum signal and then to adopt the tracking mode when the maximum signal has been sensed.

* * * * *